(No Model.)

G. G. SMITH.
SEAL FOR LOCKS, &c.

No. 386,663. Patented July 24, 1888.

Attest:
A. N. Jesbera
M. C. Finley

Inventor:
George G. Smith.
By David A. Burr.
Atty.

N. PETERS, Photo-Lithographer, Washington, D. C.

UNITED STATES PATENT OFFICE.

GEORGE G. SMITH, OF ST. ALBANS, VERMONT.

SEAL FOR LOCKS, &c.

SPECIFICATION forming part of Letters Patent No. 386,663, dated July 24, 1888.

Application filed September 1, 1887. Serial No. 248,491. (No model.)

*To all whom it may concern:*

Be it known that I, GEORGE G. SMITH, of St. Albans, in the county of Franklin and State of Vermont, have invented a new and useful Improvement in Seals for Locks, &c.; and I do hereby declare that the following is a full and exact description thereof, reference being had to the accompanying drawings, and to the letters of reference marked thereon, making a part of this specification, in which—

Figure 1:
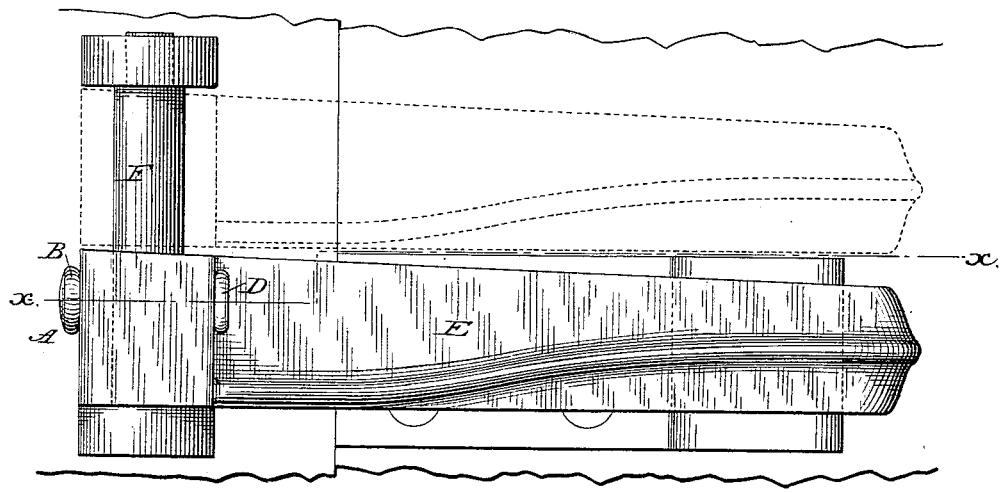
Figure 2:
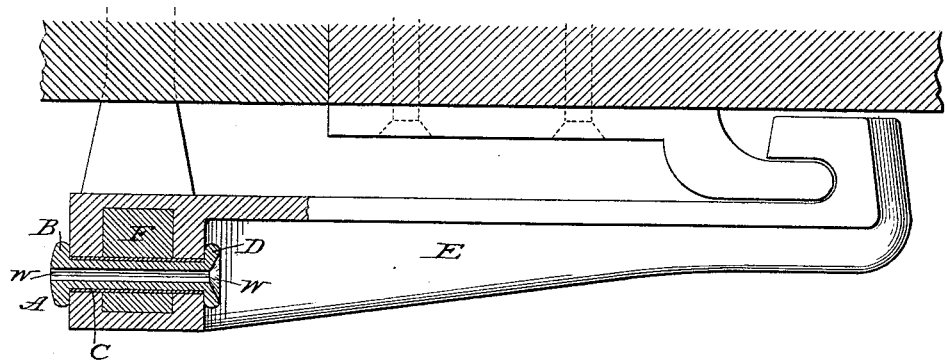
Figure 3:
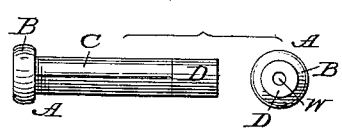

Figure 1 is a front elevation of a swinging bolt applied to a sliding door—as of a freight-car—and sealed with my improved metallic seal. Fig. 2 is an irregular longitudinal transverse section in line *x x* of Fig. 1. Fig. 3 is an elevation with an end view of the metallic seal detached; and Fig. 4, a vertical central section through the pivot of the swinging bolt, illustrating the seal applied, with an end view of the latter.

My invention is more particularly designed for use with the swinging bolt for fastening hinged and sliding doors for which Letters Patent of the United States were granted to me February 8, 1887, No. 357,344, although it may be applied to any bolt or lock which is so constructed as to permit of ready access to opposite sides of any two superimposed parts which in the operation of the bolt or lock necessarily change their relative positions, so that the sealing-bolt may be inserted through an aperture pierced in register through both parts and by its presence prevent their movement. It has for its object not only greater security and simplicity in the sealing of the lock or bolt than is found in the device heretofore employed for this purpose, but also to permit sealing the lock with a metallic seal without danger of clogging its movable parts; and it consists in the combination, with the stem or shank of a sealing-bolt of soft metal adapted to be passed through an aperture drilled through the movable parts of a lock or fastening for doors, &c., when the lock or fastening is in its operative position, of an outer encircling sleeve or collar of harder sheet metal, which will retain its cylindrical shape and its dimensions unaltered when the end of the bolt projecting outwardly therefrom is upset or enlarged to seal it. This projecting end is designed to be upset or enlarged and simultaneously stamped in the customary manner by means of a suitable punch after its insertion through the apertures in the appropriate intermovable parts of the lock or fastening device, so that the latter may not thereafter be moved without cutting off said upset end and withdrawing the sealing-bolt.

In the accompanying drawings, A (see Fig. 3) represents my improved sealing bolt or pin, which is made of a short bar or rod of soft lead or suitable alloy, preferably cylindrical in form, having an enlarged head, B, at one end thereof. So much of the length of this bolt from its head outward toward its point as is designed to be covered by the parts of the lock, bolt, or catch through which it is to be inserted is inclosed by a thin sleeve, C, of tin or other hard metal, which will serve to bind and confine the body or shank of the pin or bolt and prevent any enlargement thereof.

The outer end or point, D, of the soft-metal bolt A is left projecting beyond the encircling sleeve C far enough to permit of its forming, when properly upset, an enlarged head at that end of the bolt. In the use of this sealing bolt or pin it is inserted through an aperture pierced transversely entirely through the two superimposed parts of the fastening device to be sealed, which necessarily move one upon the other in order to permit a release of the door or other object fastened thereby. The soft end of the sealing-bolt, which projects through the aperture, is then upset by a punch or other suitable tool, so that the bolt may not be withdrawn to permit a movement of the parts without cutting off or filing or hammering down this upset end. The sleeve of hard sheet metal prevents the body of the bolt from upsetting or enlarging to fill or wedge into the adjacent movable parts of the lock. The use of this device with my patented swinging bolt as applied to the door of a freight-car is illustrated in Figs. 1 and 2 of the drawings.

Figure 4:
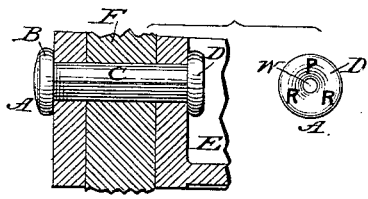

E represents the swinging bolt, having an angular aperture at its inner end, which is adapted to fit upon a pivot, F, which is made cylindrical at one end to permit the bolt to turn thereon freely and is angular at the other to engage the angular aperture when the latter is passed over it, and thereby prevent a movement of the bolt. Hence, to free the bolt, it must be moved longitudinally upon the pivot F away from its angular portion and carried upon the cylindrical portion, where it will be free to turn. This movement of the bolt, whereby it is disengaged from the door, so as to leave the latter free, is prevented by passing the sealing-bolt A, constructed as above described, through an aperture pierced transversely through both the bolt and its pivot-pin when they are locked together, and then upsetting the projecting soft end or point of the sealing-bolt, so as to enlarge it into a head, as shown in Figs. 1, 2, and 4.

To facilitate the enlargement or upsetting of the point or soft end of the sealing-bolt and to reduce its weight and cost, I preferably make said bolt tubular in form, a central aperture, W, being carried longitudinally through it from end to end.

The soft projecting end or point of the sealing-bolt may be readily upset and enlarged by means of a punch and hammer, or by means of jaws adapted to close against the head of the bolt at one end and its point at the other, the punch or jaw closing upon the point being so formed as to produce readily its radial expansion.

The punch which is used to upset or expand the soft end of the sealing-bolt may also be formed with characters *in intaglio* or in cameo upon its face, whereby an imprint will be formed and left in the enlarged end of the seal as a means for preventing an unwarranted duplication thereof.

I am aware that leaden rivets have heretofore been used in various devices for sealing locks, &c. My invention differs from the devices heretofore employed, in that a hard-metal sleeve is combined with the shank of the soft-metal sealing rivet or bolt and that said shank, so re-enforced, is made tubular.

I claim as my invention—

1. The within-described detached sealing bolt or rivet for sealing and securing locks and other fastenings, the same consisting of a rod or pin of soft metal headed at one end and encircled by a re-enforcing sleeve of harder metal extending over a portion of its length and united thereto, substantially in the manner and for the purpose herein set forth.

2. A seal for bolts and other fastenings, consisting of a longitudinally perforated or tubular pin or bolt of soft metal headed at one end, in combination with a sleeve of harder metal encircling the same for a portion of its length, substantially in the manner and for the purpose herein set forth.

In testimony whereof I have signed my name to this specification in the presence of two subscribing witnesses.

GEO. G. SMITH.

Witnesses:
A. N. JESBERA,
M. E. FINLEY.